United States Patent [19]
Ouellette

[11] Patent Number: 6,062,773
[45] Date of Patent: May 16, 2000

[54] INFEED ASSEMBLY FOR USE WITH AN AIR CONVEYOR SYSTEM

[75] Inventor: Joseph F. Ouellette, Glendale, Mo.

[73] Assignee: Oullette Machinery Systems, Inc., Fenton, Mo.

[21] Appl. No.: 08/792,659

[22] Filed: Jan. 31, 1997

[51] Int. Cl.⁷ ........................................... B23C 1/16
[52] U.S. Cl. .............................. 406/88; 406/79
[58] Field of Search ................ 406/88, 86, 79, 406/81, 80, 194

[56] References Cited

U.S. PATENT DOCUMENTS

| | | | |
|---|---|---|---|
| 4,284,370 | 8/1981 | Danler et al. | 406/86 |
| 4,822,214 | 4/1989 | Aidlin et al. | 406/86 |
| 4,938,636 | 7/1990 | Aidlin et al. | 406/31 |
| 5,028,174 | 7/1991 | Karass | 406/88 |
| 5,100,265 | 3/1992 | Mirkin | 406/86 |
| 5,147,153 | 9/1992 | Aidlin et al. | 406/86 |
| 5,161,919 | 11/1992 | Smith et al. | 406/86 |
| 5,437,521 | 8/1995 | Ouellette | 406/88 |

FOREIGN PATENT DOCUMENTS 2580609  10/1986  France .
90/10587  9/1990  WIPO .

*Primary Examiner*—William E. Terrell
*Assistant Examiner*—K W Bower
*Attorney, Agent, or Firm*—Howell & Haferkamp, LC

[57] ABSTRACT

An infeed assembly for use with an air conveyor system. The infeed assembly has a guide mechanism configured for engaging an article, such as a lightweight plastic bottle, and guiding it as it is conveyed through the conveyor system, a plurality of air jet conveyor nozzles, a plenum in fluid communication with the conveyor nozzles for forcing pressurized air through the conveyor nozzles and adjacent the guide mechanism in a manner to push the article downstream along the guide mechanism from an inlet end of the guide mechanism to an outlet end of the guide mechanism. The infeed assembly comprises an article alignment mechanism, at least one air jet infeed nozzle adjacent the article alignment mechanism, and at least one conduit providing fluid communication between the plenum and the infeed nozzle. The article alignment mechanism is positionable adjacent the inlet end of the guide mechanism and is configured for directing the article into the inlet end of the guide mechanism. The infeed nozzle and conduit are configured such that air in the plenum passes through the conduit and through the infeed nozzle in a manner to push the article into the inlet end of the guide mechanism.

18 Claims, 1 Drawing Sheet

6,062,773

INFEED ASSEMBLY FOR USE WITH AN AIR CONVEYOR SYSTEM

BACKGROUND OF THE INVENTION

This invention relates to air conveyor systems employing air jets to convey articles along a conveyor pathway.

An air conveyor is used for rapidly transporting plastic bottles or other lightweight articles between work stations as, for example, between a storage station and a bottle-filling station. A typical air conveyor includes a pair of parallel flanges spaced to define an elongate slot and a series of air jets on opposite sides of the slot. Plastic bottles are formed with annular rims adjacent the tops of their necks. With the bottle necks extending through the slot and the rims overlying the spaced flanges, the bottles are suspended from the flanges and hang below the slot. Pressurized air from the air jets is directed in streams toward the bottles. The bottles move through the slot because of the force of the air streams against the lightweight bottles.

Generally, to feed bottles into the conveyor slot, the bottles are placed on a top surface of an endless belt conveyor which conveys the bottles to an inlet end of the conveyor slot. The belt conveyor is positioned so that the necks and rims of the bottles align with the inlet end of the conveyor slot. To assist in alignment of the bottle neck and rims with the air conveyor slot as they are transported by the belt conveyor toward the input to the air conveyor slot, the air conveyor is typically provided with a pair of laterally spaced guide plates that project horizontally from the opposite sides of the air conveyor slot toward the belt conveyor and the approaching line of bottles. The guide plates have mutually opposed edges that are aligned with the opposed edges of the air conveyor flanges where the guide plates attach to the air conveyor, and diverge away from each other as the guide plates extend from the air conveyor and toward the approached stream of bottles on the belt conveyor. As the bottles are conveyed by the belt conveyor toward the air conveyor slot, their necks pass between the guide plate edges with their annular neck rings positioned just above the horizontally position guide plates. As the bottles are moved closer to the air conveyor slot, the opposed guide plate edges merge toward each other and at least one of the guide plate edges engages with the neck of any misaligned bottle and causes that bottle to move toward the center of the conveyor belt, thus aligning the misaligned bottle with the air conveyor slot.

There are two conditions that can occur that would cause a bottle being conveyed by the belt conveyor to the air conveyor input slot to fall rearwardly on the belt conveyor and thereby possibly contact other bottles on the belt conveyor causing them to fall. As a bottle is conveyed on the belt conveyor toward the air conveyor input slot, when the neck of the bottle comes into contact with one of the two guide plates, the friction from the contact between the guide plate and the bottle being moved by the belt conveyor toward the air conveyor input slot may cause the guide plate to push the bottle rearwardly on the belt, thus causing it to fall rearwardly. This has a tendency to occur as the bottle conveyed on the belt conveyor gets closer to the input of the air conveyor slot because the drag or friction force of the guide plate tending to push the bottle rearwardly will increase as the bottle is continued to be moved forwardly toward the air conveyor input slot after first making contact with the guide plate edge. Also, when the bottle is first conveyed into the air conveyor input slot by the belt conveyor, the air flow from only a few, for example the first pair of air jet heads on opposite sides of the air conveyor slot, will act against the bottle edging it to move downstream along the air conveyor slot. Only after the bottle is moved a short distance into the air conveyor slot does the air flow of more of the air jet heads act on the bottle causing it to be conveyed downstream through the air conveyor slot. When a bottle first enters the air conveyor input slot from the belt conveyor, because usually only the air flow from the first pair of air jet heads on opposite sides of the air conveyor slot acts on the bottle, at times the bottles will have a tendency to stop at the input to the air conveyor or move very slowly in the downstream direction to the air conveyor. This may result with a succeeding bottle conveyed by the belt conveyor coming into contact with the preceding bottle which at times results in the succeeding bottle being knocked rearwardly on the belt conveyor. The rearward falling of the succeeding bottle at times contacts other bottles on the belt conveyor causing them also to fall.

What is needed to overcome this problem is a device that causes bottles being transferred from the belt conveyor to the input of the air conveyor slot to quickly move into the air conveyor slot to a position sufficiently downstream in the air conveyor slot where the air flow from several of the air jet heads of the air conveyor will contact the bottle and move it downstream through the air conveyor.

SUMMARY OF THE INVENTION

Among the several objects of the present invention may be noted the provision of an improved air conveyor system which overcomes the disadvantages associated with the prior art conveyor systems; the provision of such a conveyor system configured for facilitating the feed of bottles into a conveyor slot of the air conveyor; the provision of such a conveyor system configured for reducing the likelihood that a bottle will not be fed into the conveyor slot even when the bottle is not aligned with the conveyor slot; the provision of such a conveyor system configured for reducing the likelihood that a bottle will fall backwards when the bottle is not aligned with the conveyor slot; and the provision of such a conveyor system which is of relatively simple construction.

In general, an air conveyor system of the present invention is configured for conveying articles having an article body and at least one flange extending radially outwardly from an upper portion of the article body, the flange having a pair of downwardly facing surface portions on opposite sides of the article. The conveyor system comprises a guide mechanism, a plurality of air jet conveyor nozzles, a plenum, and an article alignment mechanism. The guide mechanism in the preferred embodiment is an air conveyor comprised of a pair of spaced apart, generally parallel rails configured for engaging the surface portions of the article to thereby support the article and guide it as it is conveyed through the conveyor system. The plenum is in fluid communication with the conveyor nozzles for forcing pressurized air through the conveyor nozzles in a manner to push the article downstream along the rails from an inlet end of the guide mechanism to an outlet end of the guide mechanism. The article alignment mechanism is positionable adjacent the inlet end of the guide mechanism and configured for directing the article into the inlet end of the guide mechanism. At least one air jet infeed nozzle is adjacent the article alignment mechanism and at least one conduit provides fluid communication between the plenum and the one infeed nozzle. The infeed nozzle and conduit are configured such that air in the plenum passes through the conduit and through the infeed nozzle in a manner to push the article into the inlet end of the air conveyor.

In another aspect of the present invention, an infeed assembly is for use with an air conveyor system. The air conveyor system has a guide mechanism configured for engaging an article and guiding it as it is conveyed through the conveyor system, a plurality of air jet conveyor nozzles, and a plenum in fluid communication with the conveyor nozzles for forcing pressurized air through the conveyor nozzles and adjacent the guide mechanism in a manner to push the article downstream along the guide mechanism from an inlet end of the guide mechanism to an outlet end of the guide mechanism. The infeed assembly comprises an article alignment mechanism, at least one air jet infeed nozzle adjacent the article alignment mechanism, and at least one conduit providing fluid communication between the plenum and the infeed nozzle. The article alignment mechanism is positionable adjacent the inlet end of the guide mechanism and is configured for directing the article into the inlet end of the guide mechanism. The infeed nozzle and conduit are configured such that air in the plenum passes through the conduit and through the infeed nozzle in a manner to push the article into the inlet end of the air conveyor.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
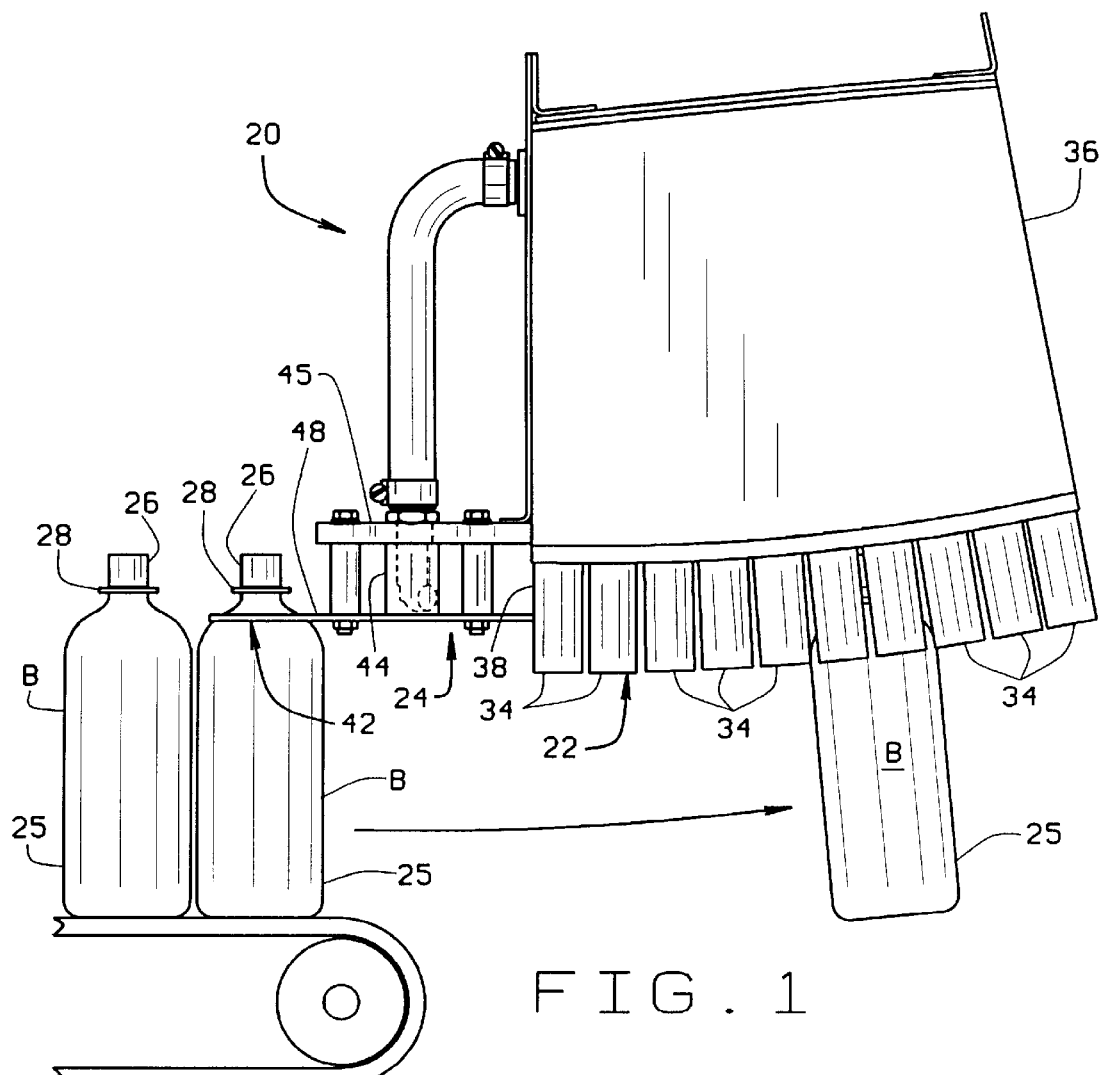
FIG. 1 is a fragmented side-elevational view of an air conveyor system of the present invention having an infeed assembly.
Figure 2:
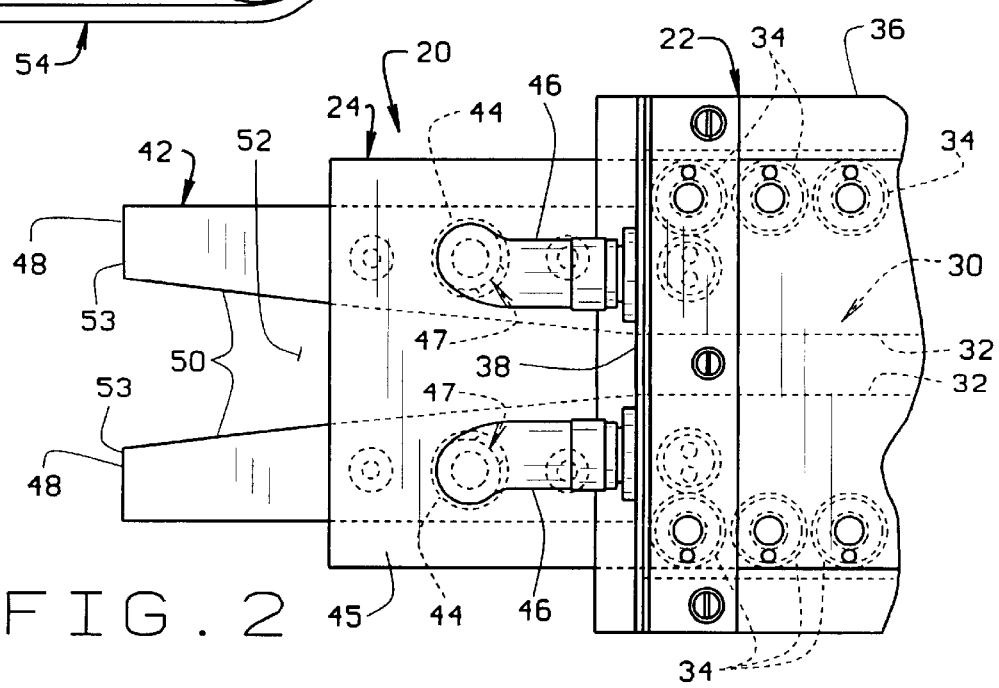
FIG. 2 is a fragmented top plan view of the infeed assembly of FIG. 1.

Referring now to the drawings, a conveyor system of the present invention is indicated in its entirety by the reference numeral 20. The conveyor system 20 comprises an air conveyor, generally indicated at 22, and an infeed assembly, generally indicated at 24. The air conveyer 22 is preferably of the type disclosed in U.S. Pat. No. 5,437,521 filed May 13, 1993, issued Aug. 1, 1995 and incorporated herein by reference. Bottles B are conveyed forwardly or in a downstream direction (i.e., from left to right as viewed in FIGS. 1 and 2) through the infeed assembly 24 and into the air conveyor 22. The bottles B are preferably conventional bottles of the type having a bottle body 25, a bottle neck 26, and an annular flange (or ring) 28 extending radially from the neck.

The air conveyor 22 comprises a guide mechanism, generally indicated at 30, including a pair of spaced apart, generally parallel rails 32. The rails 32 are configured for engaging diametrically opposite surface portions of the underside of the annular flange or ring 28 to thereby support the bottle B and guide it as it is conveyed through the air conveyor 22. The air conveyor 22 further includes a plurality of air jet conveyor nozzles 34 and a pressurized plenum 36 positioned above the guide mechanism rails 32. The plenum 36 is in fluid communication with the conveyor nozzles 34 for forcing pressurized air through the conveyor nozzles and adjacent the rails 32 in a manner to push the bottles B downstream along the rails from an inlet end 38 of the guide mechanism 30 to an outlet end. In particular, the conveyor nozzles 34 are configured for directing streams of air in directions which are generally forwardly or downstream (from left to right as viewed in FIGS. 1 and 2) but are angled toward the bottles suspended in the slot between the rails 32 and are sloped somewhat downward (i.e., toward the bottom of the page as viewed in FIG. 1) so that the air streams push against the body 25 of a bottle B suspended via the bottle ring 28 from the guide rails 32.

The infeed assembly 24 is positioned adjacent the inlet end 38 of the air conveyor 22. It comprises an article (or bottle) alignment mechanism, generally indicated at 42, two air jet infeed nozzles 44 adjacent the article alignment mechanism, and two flexible hoses 46 (or other suitable conduit) that are tapped into the air plenum 36 and provide fluid communication between the plenum 36 and the infeed nozzles. The infeed nozzles 44 are suspended below a support plate 45 that projects rearwardly from the input end of the air conveyor. The support plate 45 positions the infeed nozzles 44 such that pressurized air in the plenum 36 passes through the hoses 46 and through enlarged outlet orifices 47 of the infeed nozzles 44 and is ejected from the infeed nozzles in a direction to push the bottle neck 26 downstream into the air conveyor slot and thereby pushing the bottles B into the inlet end 38 of the guide mechanism 30.

The bottle alignment mechanism 42 is positioned adjacent the inlet end 38 of the guide mechanism 30 and is configured for first guiding the bottles B toward the inlet end 38 of the guide mechanism and then pushing them from the belt into the guide mechanism. It comprises a pair of guide plates 48 having opposing guide edges 50 spaced laterally apart and defining an article (bottle) receiving channel 52. The guide edges 50 merge toward each other as they extend forwardly from distal ends 53 of the plates toward the inlet end 38 of the guide mechanism 30. The guide edges 50 converge inwardly toward one another from their distal ends 53 to their forward ends to align the bottles B with the guide rails 32 as the bottles move forwardly between the guide edges. The spacing of the guide edges at their forward ends is adjustable to be substantially equal to the lateral spacing between the air conveyor guide rails 32.

The infeed nozzles 44 are positioned on opposite sides of the bottle receiving channel 52 and are configured for directing streams of air in a direction which is generally downstream and generally above the guide plates 48. In particular, the infeed nozzles 44 are positioned and configured for directing generally horizontal streams of air in directions slanted forwardly and inwardly. Alternatively, if the guide plates 48 are secured to the air conveyor 22 in their positions shown, the support plate 45 could be eliminated and the infeed nozzles 44 could be suspended below the guide plates where the air ejected from the nozzles will contact the bodies of the bottles.

In operation, a constant stream of bottles B is conveyed forward (from left to right as viewed in FIG. 1) to the conveyor system 20 via an endless belt conveyor 54. The belt conveyor 54 and conveyor system 20 are positioned and arranged so that the necks 26 of the bottles B pass between the guide plates 48 of the infeed assembly 24 as the bottles B are moved forward. When the forward most bottle B on the belt conveyor 54 reaches a point where its neck 26 is between the infeed nozzles 44, then the streams of air from the infeed nozzles blow against the bottle neck to quickly move it forward between the spaced rails 32 of the guide mechanism 30. The conveyor nozzles 34 then blow against the bottle body 25 to convey the bottle B forward through the air conveyor 22. Because the infeed nozzles 44 blow forward against the bottle neck 26, the bottle is unlikely to fall backward (rearward) and knock over the other bottles on the belt conveyor 54. Also, because the guide edges 50 converge inwardly, the infeed nozzles 44 will blow the bottle necks 26 into the inlet end 38 of the guide mechanism 30 even when the bottle necks are not perfectly aligned with the guide mechanism.

Although the conveyor system 20 has been described as being configured for conveying bottles, it is to be understood that other articles could be conveyed without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An air conveyor system for conveying an article having an article body and at least one flange extending radially outwardly from an upper portion of the article body, said at least one flange having a pair of downwardly facing shoulder portions on opposite sides of the article, the conveyor system comprising:
    a guide mechanism comprising a pair of spaced apart, generally parallel rails configured for engaging the shoulder portions to thereby support the article and guide the article as it is conveyed through the conveyor system;
    a plurality of air jet conveyor nozzles;
    a plenum in fluid communication with the conveyor nozzles for forcing pressurized air through the conveyor nozzles and adjacent the guide mechanism in a manner to push the article downstream along the rails from an inlet end of the guide mechanism to an outlet end of the guide mechanism;
    an article alignment mechanism positionable adjacent the inlet end of the guide mechanism and configured for directing the article into the inlet end of the guide mechanism, said article alignment mechanism comprises a pair of guide plates having opposing guide edges spaced laterally apart and defining an article receiving channel, said guide edges extending rearwardly from the inlet end of the guide mechanism and having forward ends generally adjacent the inlet end of the guide mechanism and distal ends upstream of the guide mechanism, the guide edges converge continuously inwardly toward one another from the distal ends thereof to the forward ends thereof to align the article with the guide rails of the guide mechanism as the article moves forwardly between the guide edges;
    at least one air jet infeed nozzle between the distal ends and the forward ends of the article alignment mechanism guide edges; and
    at least one conduit providing fluid communication between the plenum and said at least one infeed nozzle;
    said at least one infeed nozzle and said conduit being configured such that air in the plenum passes through the conduit and through said at least one infeed nozzle in a manner to push the article into the inlet end of the guide mechanism.

2. An air conveyor system as set forth in claim 1 wherein said at least one infeed nozzle is shaped and configured for directing at least one generally horizontal stream of air adjacent the article alignment mechanism.

3. An air conveyor system as set forth in claim 1 wherein said conveyor nozzles are positioned and configured for directing streams of air in generally downstream directions, and wherein said at least one infeed nozzle is positioned and configured for directing a stream of air in a direction which is generally downstream and generally above the streams of air from the conveyor nozzles.

4. An air conveyor system as set forth in claim 1 wherein said at least one infeed nozzle comprises a pair of infeed nozzles on opposite sides of the article receiving channel.

5. An air conveyor system as set forth in claim 4 wherein said infeed nozzles are positioned and configured for directing generally horizontal streams of air forwardly and inwardly.

6. An air conveyor system as set forth in claim 4 wherein the conveyor nozzles are positioned and configured for directing streams of air in generally forward directions, and wherein the infeed nozzles are positioned and configured for directing streams of air in directions which are generally above the streams of air from the conveyor nozzles.

7. An infeed assembly for use with an air conveyor system having a guide mechanism configured for engaging an article and guiding the article as the article is conveyed through the conveyor system, a plurality of air jet conveyor nozzles, and a plenum in fluid communication with the conveyor nozzles for forcing pressurized air through the conveyor nozzles and adjacent the guide mechanism in a manner to push the article downstream along the guide mechanism from an inlet end of the guide mechanism to an outlet end of the guide mechanism, the infeed assembly comprising:
    an article alignment mechanism positionable adjacent the inlet end of the guide mechanism and configured for directing the article into the inlet end of the guide mechanism, said article alignment mechanism comprises a pair of guide plates having opposing guide edges spaced laterally apart and defining an article receiving channel, said guide edges extending rearwardly from the inlet end of the guide mechanism and having forward ends generally adjacent the inlet end of the guide mechanism and distal ends upstream of the guide mechanism, the guide edges converge continuously inwardly toward one another from the distal ends thereof to the forward ends thereof to align the article with the guide rails of the guide mechanism as the article moves forwardly between the guide edges;
    at least one air jet infeed nozzle between the distal ends and forward ends of the article alignment mechanism guide edges; and
    at least one conduit providing fluid communication between the plenum and said at least one infeed nozzle;
    said at least one infeed nozzle and said conduit being configured such that air in the plenum passes through the conduit and through said at least one infeed nozzle in a manner to push the article into the inlet end of the guide mechanism.

8. An infeed assembly as set forth in claim 7 wherein said at least one infeed nozzle is shaped and configured for directing at least one generally horizontal stream of air adjacent the article alignment mechanism.

9. An infeed assembly as set forth in claim 7 wherein said at least one infeed nozzle comprises a pair of infeed nozzles on opposite sides of the article receiving channel.

10. An infeed assembly as set forth in claim 7 wherein said at least one infeed nozzle comprises a pair of infeed nozzles on opposite sides of the article receiving channel.

11. An infeed assembly as set forth in claim 10 wherein said infeed nozzles are positioned and configured for directing generally horizontal streams of air forwardly and inwardly.

12. An apparatus for transferring articles from a belt conveyor to an air conveyor having a conveying slot lined with air jet heads with air outlets and an air plenum supplying air to the air jet heads where the air is ejected through the air outlets, the apparatus comprising:

- at least one infeed nozzle positioned outside the air conveyor slot and adjacent to the belt conveyor, the infeed nozzle having an outlet orifice that is larger than the air outlets of the air conveyor air jet heads and is configured to eject a jet of air toward the air conveyor slot; and
- a supply of air communicating with the infeed nozzle;
- wherein the infeed nozzle is positioned relative to the belt conveyor and the air conveyor slot to cause the jet of air ejected from the infeed nozzle outlet orifice to contact the articles conveyed on the belt conveyor and push the articles into the air conveyor slot.

13. The apparatus of claim 12, wherein:

the supply of air to the infeed nozzle comprising by the air plenum.

14. The apparatus of claim 13, further comprising:

a pair of guide plates positioned over the belt conveyor where the pair of plates direct the articles conveyed by the belt conveyor to positions relative to the infeed nozzle where the jet of air from the infeed nozzle contacts the articles and pushes the articles into the air conveyor slot.

15. The apparatus of claim 12, further comprising:

a pair of guide plates positioned outside the air conveyor slot and adjacent to the belt conveyor, the pair of guide plates having opposing guide edges spaced laterally apart and defining an article receiving channel, said guide edges extending rearwardly from the air conveyor and having forward ends generally adjacent to the air conveyor and distal ends generally adjacent to the belt conveyor, the guide edges converge inwardly toward one another from the distal ends thereof to the forward ends thereof, and the infeed nozzle is positioned adjacent to the guide edges and between the forward ends and the distal ends of the guide edges.

16. The apparatus of claim 12, wherein:

the infeed nozzle is one of two like infeed nozzles in communication with the supply of air and positioned relative to the belt conveyor and the air conveyor slot to cause jets of air ejected from the two infeed nozzles outlet orifices to contact the articles conveyed on the belt conveyor and push the articles into the air conveyor slot.

17. The apparatus of claim 16, wherein:

the two infeed nozzles are positioned apart from each other to permit the articles conveyed on the belt conveyor to pass between the two infeed nozzles.

18. An apparatus for transferring articles from a belt conveyor to an air conveyor having a conveying slot lined with air jet heads and an air plenum supplying air to the air jet heads, the apparatus comprising:

- at least one infeed nozzle positioned outside the air conveyor slot and adjacent to the belt conveyer, the infeed nozzle having an outlet orifice configured to eject a jet of air toward the air conveyor slot; and
- a supply of air communicating with the infeed nozzle;
- wherein the infeed nozzle is positioned relative to the belt conveyor and the air conveyor slot to cause the jet of air ejected from the infeed nozzle outlet orifice to contact the articles conveyed on the belt conveyor and push the articles into the air conveyor slot; and
- a hose connected to the infeed nozzle and tapped into the air plenum of the air conveyor to communicate the supply of air to the infeed nozzle.

\* \* \* \* \*